United States Patent
Sumii

(10) Patent No.: US 12,479,224 B2
(45) Date of Patent: Nov. 25, 2025

(54) LIQUID EJECTION APPARATUS, CONTROL METHOD OF LIQUID EJECTION APPARATUS, AND A NON-TRANSITORY COMPUTER READABLE MEDIUM STORING A PROGRAM

(71) Applicant: SEIKO EPSON CORPORATION, Tokyo (JP)

(72) Inventor: Atsushi Sumii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 283 days.

(21) Appl. No.: 18/063,448

(22) Filed: Dec. 8, 2022

(65) Prior Publication Data

US 2023/0211620 A1  Jul. 6, 2023

(30) Foreign Application Priority Data

Dec. 10, 2021  (JP) ................. 2021-200663

(51) Int. Cl.
*B41J 29/393*  (2006.01)
*B41J 13/00*  (2006.01)
*B41J 13/08*  (2006.01)
*B41J 29/17*  (2006.01)

(52) U.S. Cl.
CPC ......... *B41J 29/393* (2013.01); *B41J 13/0027* (2013.01); *B41J 13/08* (2013.01); *B41J 29/17* (2013.01)

(58) Field of Classification Search
CPC ...... B41J 29/393; B41J 13/0027; B41J 13/08; B41J 29/17; B41J 2/01; B41J 29/38; B41J 11/007; B65G 45/10; B65G 45/12; B65G 45/24; B65G 45/005; B65G 45/00
See application file for complete search history.

(56) References Cited

U.S. PATENT DOCUMENTS

| | | |
|---|---|---|
| 8,777,344 B2 | 7/2014 | Ito |
| 2010/0245432 A1 | 9/2010 | Takeda et al. |
| 2013/0033533 A1 | 2/2013 | Ito |

(Continued)

FOREIGN PATENT DOCUMENTS

| | | |
|---|---|---|
| JP | 2001-179953 A | 7/2001 |
| JP | 2007-054999 A | 3/2007 |

(Continued)

*Primary Examiner* — Thinh H Nguyen
(74) *Attorney, Agent, or Firm* — WORKMAN NYDEGGER

(57) ABSTRACT

The liquid ejection apparatus includes a liquid ejection section that ejects liquid onto a medium, a transport belt that transports the medium, a cleaning member that cleans the transport belt by coming into contact with the transport belt, the cleaning member being capable of switching between a contact state in which the cleaning member comes into contact with the transport belt and a separation state in which the cleaning member is separated from the transport belt, and a control section that controls an ejection operation of the liquid, a rotation operation of the transport belt, and switching a state of the cleaning member, when a cleaning operation of cleaning the transport belt by the cleaning member is executed, the control section executes a preliminary ejection that ejects in advance liquid from the liquid ejection section to the transport belt based on preset cleaning control information.

14 Claims, 10 Drawing Sheets

(56) References Cited

U.S. PATENT DOCUMENTS

2013/0276654 A1* 10/2013 Belbeck ................ B41J 29/17
 101/425
2016/0279970 A1* 9/2016 Nakata ................ B41J 13/025
2021/0229458 A1* 7/2021 Asamoto ............... B41J 29/17

FOREIGN PATENT DOCUMENTS

| JP | 2007-283634 | 11/2007 |
| JP | 2010-228164 A | 10/2010 |
| JP | 2013-035152 | 2/2013 |

* cited by examiner

FIG. 7A

| | | EJECTION DUTY | |
|---|---|---|---|
| | | LOW | HIGH |
| | | SUITABLE | UNSUITABLE |
| HUMIDITY | HIGH | UNSUITABLE | OFF | OFF |
| | LOW | SUITABLE | ON | OFF |

FIG. 7B

| | | EJECTION DUTY | | |
|---|---|---|---|---|
| | | LOW | MEDIUM | HIGH |
| | | SUITABLE | SUITABLE | UNSUITABLE |
| HUMIDITY | HIGH | UNSUITABLE | OFF | OFF | OFF |
| | LOW | SUITABLE | ON | ON | OFF |

FIG. 7C

| | | EJECTION DUTY | |
|---|---|---|---|
| | | LOW | HIGH |
| | | SUITABLE | UNSUITABLE |
| HUMIDITY | HIGH | UNSUITABLE | OFF | OFF |
| | MEDIUM | UNSUITABLE | OFF | OFF |
| | LOW | SUITABLE | ON | OFF |

FIG. 7D

| | | EJECTION DUTY | | |
|---|---|---|---|---|
| | | LOW | MEDIUM | HIGH |
| | | SUITABLE | SUITABLE | UNSUITABLE |
| HUMIDITY | HIGH | UNSUITABLE | OFF | OFF | OFF |
| | MEDIUM | UNSUITABLE | OFF | OFF | OFF |
| | LOW | SUITABLE | ON | ON | OFF |

FIG. 8A

|  |  | | EJECTION DUTY | |
|---|---|---|---|---|
|  |  | | LOW | HIGH |
|  |  | | SUITABLE | UNSUITABLE |
| HUMIDITY | HIGH | UNSUITABLE | OFF | OFF |
|  | MEDIUM | SUITABLE | ON | OFF |
|  | LOW | SUITABLE | ON | OFF |

FIG. 8B

|  |  | | EJECTION DUTY | | |
|---|---|---|---|---|---|
|  |  | | LOW | MEDIUM | HIGH |
|  |  | | SUITABLE | SUITABLE | UNSUITABLE |
| HUMIDITY | HIGH | UNSUITABLE | OFF | OFF | OFF |
|  | MEDIUM | SUITABLE | ON | OFF | OFF |
|  | LOW | SUITABLE | ON | ON | OFF |

FIG. 9A

| EJECTION DUTY Q | Q < Q1 | Q1 ≤ Q < Q2 | Q2 ≤ Q < Q3 | Q3 ≤ Q |
|---|---|---|---|---|
| COEFFICIENT | 1 | 0.8 | 0.5 | 0.3 |

FIG. 9B

| HUMIDITY H | H < H1 | H1 ≤ H < H2 | H2 ≤ H < H3 | H3 ≤ H < H4 | H4 ≤ H |
|---|---|---|---|---|---|
| COEFFICIENT | 1.3 | 1.15 | 1.0 | 0.85 | 0.6 |

FIG. 9C

| TEMPERATURE S | S < S1 | S1 ≤ S < S2 | S2 ≤ S < S3 | S3 ≤ S < S4 | S4 ≤ S |
|---|---|---|---|---|---|
| COEFFICIENT | 0.9 | 0.95 | 1.0 | 1.05 | 1.1 |

FIG. 9D

| ELAPSED TIME T | T < T1 | T1 ≤ T < T2 | T2 ≤ T < T3 | T3 ≤ T |
|---|---|---|---|---|
| COEFFICIENT | 1.0 | 1.1 | 1.3 | 1.5 |

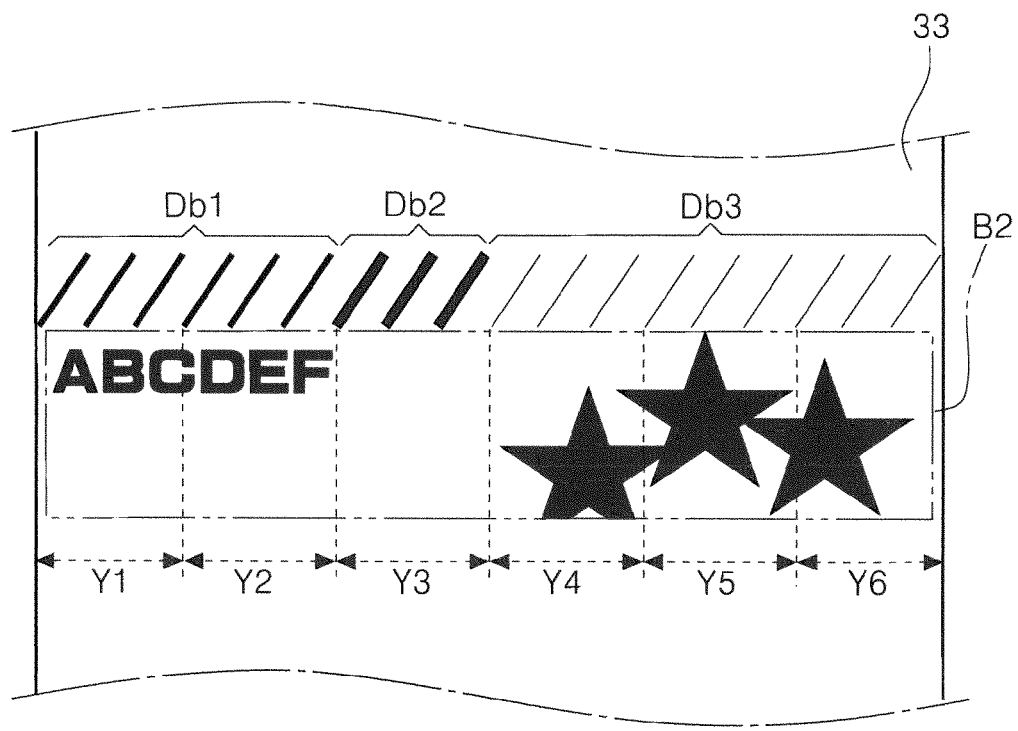
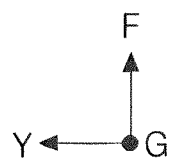
FIG. 10

LIQUID EJECTION APPARATUS, CONTROL METHOD OF LIQUID EJECTION APPARATUS, AND A NON-TRANSITORY COMPUTER READABLE MEDIUM STORING A PROGRAM

The present application is based on, and claims priority from JP Application Serial Number 2021-200663, filed Dec. 10, 2021, the disclosure of which is hereby incorporated by reference herein in its entirety.

BACKGROUND

1. Technical Field

The present disclosure relates to a liquid ejection apparatus for ejecting a liquid onto a medium. The present disclosure also relates to a control method of controlling the liquid ejection apparatus and a non-transitory computer readable medium storing a program.

2. Related Art

In a liquid ejection apparatus represented by a printer, a configuration in which a medium, represented by a recording sheet, is transported by a transport belt is known, and in such a configuration, a configuration may be used in which a blade cleans ink adhered to the transport belt. The blade described in the JP-A-2001-179953 is made of urethane rubber coated with fluororesin, and is provided so as to be able to contact and separate from the transport belt.

For example, when the medium is jammed and ink is ejected without the medium on the transport belt, that is, when ink is erroneously ejected, ink landing portions and ink non-landing portions may be formed on the transport belt. In addition, even at ink landing portions, the amount of ink that has landed may be small. Since landing portions are wet regions, the slipperiness between the transport belt and the blade is good. On the other hand, in non landing portions or landing portions where the amount of the ink is small, the slipperiness between the transport belt and the blade becomes poor. If the slipperiness between the transport belt and the blade is poor, the blade in contact with the transport belt may be damaged, and the function of the blade may not be maintained.

SUMMARY

A liquid ejection apparatus according to an embodiment of the present disclosure for solving the above problem includes a liquid ejection section that ejects liquid onto a medium; a transport belt that faces the liquid ejection section and transports the medium; a cleaning member for cleaning the transport belt by coming into contact with the transport belt, the cleaning member being capable of switching between a contact state in which the cleaning member comes into contact with the transport belt and a separation state in which the cleaning member is separated from the transport belt; and a control section that controls an ejection operation of the liquid by the liquid ejection section, a rotation operation of the transport belt, and switching of a state of the cleaning member, wherein when the control section performs a cleaning operation for cleaning the transport belt by the cleaning member, the control section performs preliminary ejection to, based on preset cleaning control information, eject in advance liquid from the liquid ejection section to the transport belt.

Further, the control method of the liquid ejection apparatus according to the present disclosure includes a liquid ejection section that ejects liquid onto a medium; a transport belt that faces the liquid ejection section and transports the medium; and a cleaning member that cleans the transport belt by coming into contact with the transport belt, the cleaning member is capable of switching between a contact state in which the cleaning member comes into contact with the transport belt and a separation state in which the cleaning member is separated from the transport belt, the control method of the liquid ejection apparatus includes: when the transport belt is cleaned by the cleaning member, a preliminary ejection is performed in which liquid is ejected from the liquid ejection section to the transport belt in advance.

Further, a non-transitory computer-readable recording medium having stored therein a program of the present disclosure, that is executed by a control section of a liquid ejection apparatus, the liquid ejection apparatus including a liquid ejection section that ejects liquid onto a medium; a transport belt that faces the liquid ejection section and transports the medium; and a cleaning member that cleans the transport belt by coming into contact with the transport belt, the cleaning member being capable of switching between a contact state in which the cleaning member is in contact with the transport belt and a separation state in which the cleaning member is separated from the transport belt, the program having a step of, when the transport belt is cleaned by the cleaning member, executing a preliminary ejection in which liquid is ejected in advance from the liquid ejection section to the transport belt.

BRIEF DESCRIPTION OF THE DRAWINGS

FIG. 7A is a table showing an example of cleaning control information.

FIG. 7B is a table showing another example of cleaning control information.

FIG. 7C is a table showing still another example of cleaning control information.

FIG. 7D is a table showing a further example of cleaning control information.

FIG. 8A is a table showing an example of cleaning control information.

FIG. 8B is a table showing an another example of cleaning control information.

FIG. 9A is a table showing an example of ejection amount adjustment information.

FIG. 9B is a table showing another example of ejection amount adjustment information.

FIG. 9C is a table showing still another example of the ejection amount adjustment information.

FIG. 9D is a table showing a further example of the ejection amount adjustment information.

FIG. 10 is a diagram showing an example of an ink ejection region in a case where ink is erroneously ejected onto the transport belt.

DESCRIPTION OF EMBODIMENTS

Figure 1:
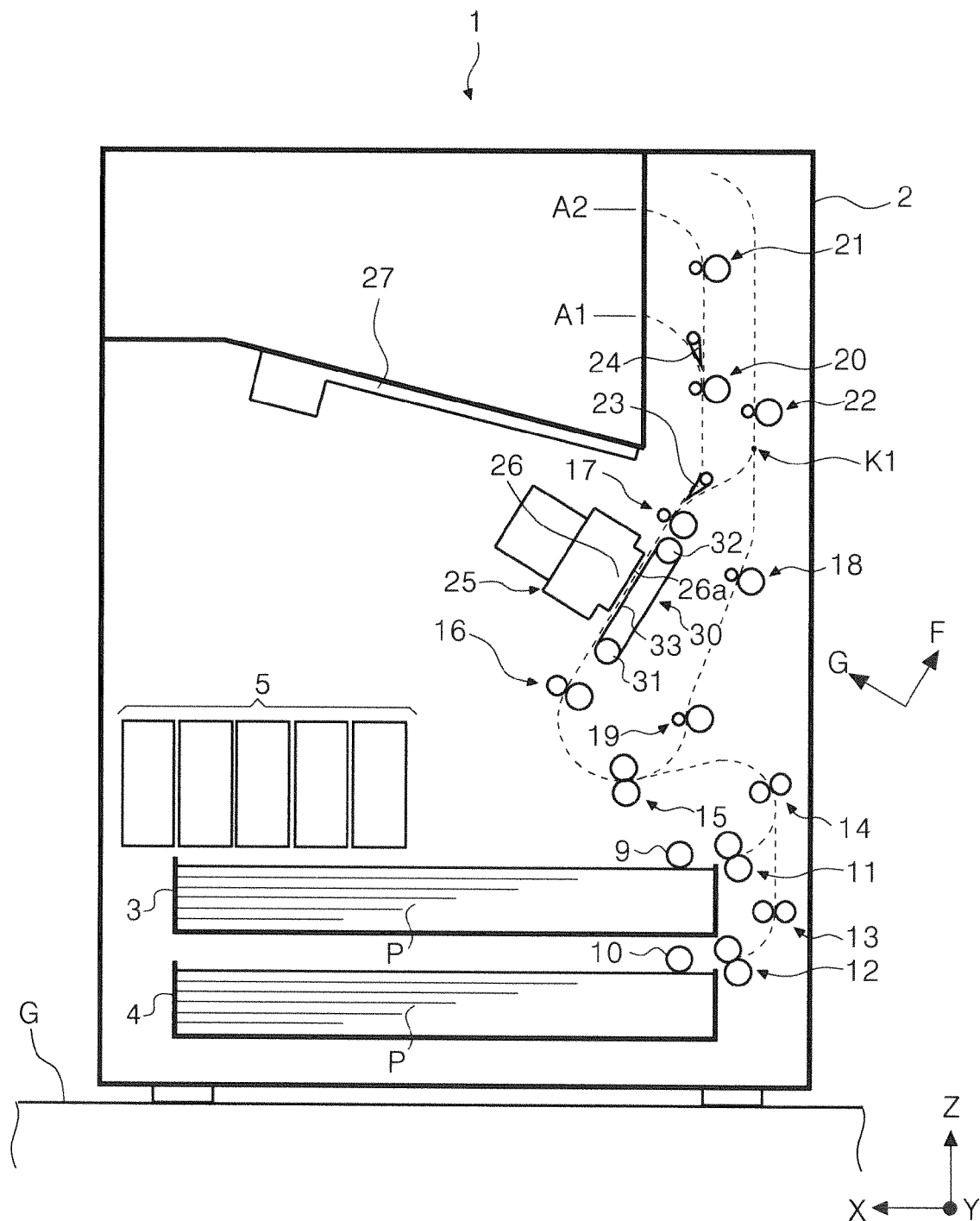
FIG. 1 is a diagram illustrating a medium transport path of a printer.

Hereinafter, the present disclosure will be schematically described. A liquid ejection apparatus according to a first aspect includes a liquid ejection section that ejects liquid onto a medium, a transport belt that faces the liquid ejection section and transports the medium, a cleaning member that cleans the transport belt by coming into contact with the transport belt, the cleaning member being capable of switching between a contact state in which the cleaning member is in contact with the transport belt and a separation state in which the cleaning member is separated from the transport belt, and a control section that controls a liquid ejection operation by the liquid ejection section, a rotation operation of the transport belt, and switching a state of the cleaning member, wherein, when the cleaning operation that cleans the transport belt by the cleaning member is performed, the control section performs preliminary ejection that preliminarily ejects the liquid from the liquid ejection section to the transport belt based on preset cleaning control information.

According to this aspect, when the control section performs a cleaning operation for cleaning the transport belt by using the cleaning member, the control section performs preliminary ejection in which the liquid is ejected from the liquid ejection section to the transport belt in advance on the basis of preset cleaning control information. Therefore, slipperiness between the transport belt and the cleaning member becomes better by the preliminary ejection, and thus a function of the cleaning member can be maintained.

According to the second aspect, in addition to the first aspect, as a preliminary ejection execution condition, the cleaning control information includes at least one of among discharge duty, humidity, temperature, when the liquid is erroneously ejected from the liquid ejection section, and elapsed time from the erroneously ejected. Further, the execution condition is set so as to affect at least one event affects on the execution of the preliminary ejection, among which are a first event in which the ejection duty is low relative to a first ejection duty, a second event in which the humidity is low relative to a first humidity, a third event in which the temperature is high relative to a first temperature, and a fourth event in which the elapsed time is longer than a first elapsed time.

According to this aspect, the cleaning control information is set so that least one of the first event in which the ejection duty is lower than the first ejection duty, the second event in which the humidity is lower than the first humidity, the third event in which the temperature is higher than the first temperature, and the fourth event in which the elapsed time is longer than the first elapsed time, affects the execution of the preliminary ejection. Therefore, the preliminary ejection is appropriately performed according to the state when the cleaning operation is performed, and the function of the cleaning member can be maintained. In addition, since the preliminary ejection is not performed when the preliminary ejection is unnecessary, it is possible to suppress wasteful consumption of the liquid. It should be noted that the fact that each of the first event, the second event, the third event, and the fourth event affects on the execution of the preliminary ejection does not mean that the preliminary ejection is necessarily executed when each event occurs, but means that the occurrence of each event favors the execution of the preliminary ejection.

According to a third aspect, in the second aspect, the cleaning control information sets the ejection duty and the humidity as a preliminary ejection execution condition, causes the control section to execute the preliminary ejection when the first event and the second event occur at the same time, and prevents the control section from executing the preliminary ejection when the first event and the second event do not occur at the same time.

When the second event has not occurred even though the first event has occurred, the slipperiness between the transport belt and the cleaning member is likely to be secured. According to this aspect, since the preliminary ejection is not executed in such a case, it is possible to suppress wasteful consumption of the liquid.

According to a fourth aspect, in any one of the first to third aspects, the control section adjusts liquid ejection amount when the preliminary ejection is executed based on ejection amount adjustment information set in advance. According to this aspect, since the control section adjusts the liquid ejection amount at the time of executing the preliminary ejection on the basis of ejection amount adjustment information set in advance, the liquid ejection amount at the time of executing the preliminary ejection is set to an appropriate amount, so that slipperiness between the transport belt and the cleaning member becomes good, and wasteful consumption of liquid can be suppressed.

According to a fifth aspect, in the fourth aspect, the ejection amount adjustment information includes one or more of the ejection duty, the humidity, the temperature, and the elapsed time as an adjustment condition of the liquid ejection amount, and is set such that at least one of a decrease in the ejection duty, a decrease in the humidity, an increase in the temperature, and an increase in the elapsed time affects on an increase in the liquid ejection amount in the preliminary ejection.

According to this aspect, one or more of the ejection duty, the humidity, the temperature, and the elapsed time are included as adjustment conditions of the liquid ejection amount, and at least one of a decrease in the ejection duty, a decrease in the humidity, an increase in the temperature, and an increase in the elapsed time is set to affect on an increase in the liquid ejection amount in the preliminary ejection. Therefore, when the slipperiness between the transport belt and the cleaning member is low, the liquid ejection amount increases, and then the slipperiness between the transport belt and the cleaning member can be appropriately improved.

According to a sixth aspect, in the fifth aspect, the ejection amount adjustment information includes the ejection duty as a determination condition of the liquid ejection amount, and the control section calculates the ejection duty for each region defined along a width direction which is a direction intersecting with a traveling direction of the transport belt and adjusts the liquid ejection amount for each region.

According to this aspect, since the control section calculates the ejection duty for each region defined along the width direction that is a direction intersecting with the traveling direction of the transport belt and adjusts the liquid ejection amount for each region, the liquid ejection amount is adjusted in a finer range, slipperiness between the transport belt and the cleaning member becomes good, and wasteful consumption of liquid can be suppressed.

In a seventh aspect, in any one of the second to sixth aspects, the control section executes the preliminary ejection such that the cleaning member contacts a region of the transport belt, on which the preliminary ejection has been executed, than before a region on which the liquid has landed due to the erroneous ejection.

According to this aspect, the control section executes the preliminary ejection such that the cleaning member contacts a region of the transport belt, on which the preliminary ejection has been executed, than before a region on which the liquid has landed due to the erroneous ejection. Therefore, the cleaning member is wetted in advance to clean the erroneously ejected region, and the function of the cleaning member can be more reliably maintained.

An eighth aspect is characterized in that, in any one of the second to seventh aspects, the control section executes the preliminary ejection so as to avoid a portion where the liquid has landed due to the erroneous ejection on the transport belt.

According to this aspect, since the control section executes the preliminary ejection so as to avoid a portion where the liquid has landed due to the erroneous ejection on the transport belt, it is possible to suppress wasteful consumption of the liquid by executing the preliminary ejection so as to avoid a portion that has already been wetted.

A ninth aspect is that, in any one of the second to seventh aspects, the control section selects, when performing the preliminary ejection, based on preliminary ejection region setting information, a first ejection mode in which the liquid is ejected so as to avoid a portion of the transport belt on which the liquid has landed due to the erroneous ejection, and a second ejection mode in which the liquid is ejected toward a portion of the transport belt on which the liquid has landed due to the erroneous ejection and a portion on which the liquid has not landed.

According to this aspect, when the preliminary ejection is executed, the control section selects the first ejection mode in which the liquid is ejected so as to avoid the portion where the liquid has landed due to the erroneous ejection on the transport belt and the second ejection mode in which the liquid is ejected on the portion where the liquid has landed due to the erroneous ejection and the portion where the liquid has not landed due to the erroneous ejection on the transport belt based on the ejection region setting information set in advance, and thus it is possible to suppress the consumption amount of the liquid in the first ejection mode. In addition, in the second ejection mode, since the liquid is also ejected to the portion where the liquid has landed on the transport belt due to the erroneous ejection, it is possible to soften the portion where the liquid has landed due to the erroneous ejection, and it is possible to enhance the cleaning effect.

In the ninth aspect, a tenth aspect is characterized in that the control section is set to select the first ejection mode when the humidity exceeds a reference humidity, and to select the second ejection mode when the humidity is equal to or lower than the reference humidity.

According to this aspect, in a case where the drying of the portion where the liquid has landed on the transport belt due to the erroneous ejection has not progressed, the first ejection mode is selected, and it is possible to suppress the consumption of the liquid. Further, when drying of the portion where the liquid has landed on the transport belt due to the erroneous ejection has progressed, the second ejection mode is selected, and the portion where the liquid has landed on the transport belt due to the erroneous ejection can be softened, and the cleaning effect can be enhanced.

An eleventh aspect is one of the first to tenth aspects, characterized in that the control section rotates the transport belt while maintaining the cleaning member in the separation state until the cleaning member reaches a region where liquid has landed on the transport belt, and switches the cleaning member from the separation state to the contact state when the cleaning member reaches a region where liquid has landed on the transport belt.

According to this aspect, the control section rotates the transport belt while maintaining the cleaning member in the separation state until the cleaning member faces the region where the liquid has landed on the transport belt, and switches the cleaning member from the separation state to the contact state when the cleaning member faces the region where the liquid has landed on the transport belt. Therefore, it is possible to suppress the period during which the cleaning member is in contact with the region where the liquid has not landed on the transport belt, and thereby it is possible to more reliably maintain the function of the cleaning member.

A controlling method according to a twelfth aspect is a control method of a liquid ejection apparatus, the liquid ejection apparatus includes a liquid ejection section that ejects a liquid to a medium, a transport belt that faces the liquid ejection section and transports the medium, and a cleaning member that cleans the transport belt by coming into contact with the transport belt and is capable of switching between a contact state in which the cleaning member is in contact with the transport belt and a separation state in which the cleaning member is separated from the transport belt, the control method including, when the transport belt is cleaned by the cleaning member, preliminary ejection is executed in which liquid is ejected from the liquid ejection section to the transport belt in advance.

According to this aspect, when the cleaning operation of cleaning the transport belt by the cleaning member is executed, the preliminary ejection of ejecting the liquid from the liquid ejection section to the transport belt in advance is executed. Therefore, the slipperiness between the transport belt and the cleaning member is improved by the preliminary ejection, and thus it is possible to maintain the function of the cleaning member.

A program according to a thirteenth aspect is a program executed by a control section of a liquid ejection apparatus, the liquid ejection apparatus including a liquid ejection section that ejects a liquid to a medium, a transport belt that faces the liquid ejection section and transports the medium, and a cleaning member that cleans the transport belt by coming into contact with the transport belt and is capable of switching between a contact state in which the cleaning member is in contact with the transport belt and a separation state in which the cleaning member is separated from the transport belt, the program includes, when the transport belt is cleaned by the cleaning member, having a step of executing preliminary ejection in which liquid is ejected in advance from the liquid ejection section to the transport belt.

According to this aspect, when the cleaning operation of cleaning the transport belt by the cleaning member is executed, the preliminary ejection of ejecting the liquid from the liquid ejection section to the transport belt in advance is executed. Therefore, the slipperiness between the transport belt and the cleaning member is improved by the preliminary ejection, and thus it is possible to maintain the function of the cleaning member.

Hereinafter, the present disclosure will be specifically described. Hereinafter, an inkjet printer 1 that records by ejecting a liquid, represented by ink, onto a medium, represented by recording sheets, is described as an example of a liquid ejection apparatus. Hereinafter, the inkjet printer 1 will be abbreviated as printer 1.

An X-Y-Z coordinate system shown in each drawing is an cartesian coordinate system, and a Y axis direction is a width direction intersecting with a transport direction of a medium and is a device depth direction. In the Y axis direction, a +Y direction is a direction from a front surface of the apparatus toward a back surface of the apparatus, and a −Y direction is a direction from the back surface of the apparatus toward the front surface of the apparatus. Further, an X axis direction is the apparatus width direction, a +X direction, which is the direction of the arrow as viewed from an operator of the printer 1, is on the left side, and a −X direction opposite to the +X direction is on the right side. A Z axis direction is a vertical direction, that is, the apparatus height direction, a +Z, which is the direction in which the arrow is directed, is an upward direction, and a −Z direction opposite thereto is a downward direction.

Further, a G axis direction is a normal direction with respect to an ink ejection surface 26a of a line head 26 to be described later. In addition, a F axis direction is a direction parallel to the ink ejection surface 26a and is a medium transport direction at a position facing the ink ejection surface 26a, a +F direction, which is a direction of the arrow, is downstream in transport direction, and a −F direction opposite thereto is a upstream in transport direction. Hereinafter, a direction in which a medium is transported may be referred to as "downstream", and a direction opposite thereto may be referred to as "upstream". In some drawings, an F-G-Y coordinate system is used instead of the X-Y-Z coordinate system.

In FIG. 1, a medium transport path is indicated by a broken line. In the printer 1, the medium is transported through a medium transport path indicated by a broken line. An apparatus main body 2 of the printer 1 includes a first medium cassette 3 and a second medium cassette 4 that store media before feeding. Reference numeral P denotes a medium contained in each medium cassette. The first medium cassette 3 and the second medium cassette 4 are provided so as to be attachable to and detachable from the apparatus main body 2 from the apparatus front side surface. A pick-up roller 9 for feeding out the contained medium is provided for the first medium cassette 3, and a pick-up roller 10 for feeding out the contained medium is provided for the second medium cassette 4.

Further, a feed roller pair 11 for feeding the sent-out medium in an obliquely upward direction is provided for the first medium cassette 3. A feed roller pair 12 for feeding the sent-out medium in an obliquely upward direction and a transport roller pair 13 that transports the medium upward direction are provided for the second medium cassette 4. In the following description, unless otherwise described, the "roller pair" is composed of a drive roller driven by a motor (not shown) and a driven roller that is driven to rotate by contact with the drive roller.

The medium sent out from each medium cassette is sent to a transport roller pair 16 by a transport roller pair 14 and a transport roller pair 15. The medium that receives the feeding force from the transport roller pair 16 is sent to a position between the line head 26 and a transport belt 33, that is, a position facing the line head 26.

The head unit 25 includes the line head 26, and the line head 26 performs recording by ejecting ink, which is an example of liquid, onto the surface of the medium. The line head 26 is an ink ejection head configured such that nozzles (not shown) for ejecting ink covers the entire region in the medium width direction, and is configured as an ink ejection head capable of recording on the entire region in the medium width direction without moving in the medium width direction. The line head 26 is an example of a liquid ejection section that ejects liquid. However, the ink ejection head may be of a type that executes recording while moving in the medium width direction.

Reference numeral 5 denotes an ink storage section that stores ink. Ink ejected from the line head 26 is supplied from the ink storage section 5 to the line head 26 through a tube (not shown). The ink storage section 5 is composed of a plurality of ink tanks arranged along the X axis direction.

The transport belt 33, the drive pulley 31, and the driven pulley 32 constitute a belt unit 30. The transport belt 33 is an endless belt wound around the drive pulley and the driven pulley 32. The transport belt 33 rotates when the drive pulley 31 is driven by a belt drive motor 57 (refer to FIG. 2). The medium is transported to a position facing the line head 26 while being attracted by the transport belt 33. Attraction of the medium to the transport belt 33 will be explained later.

Here, the medium transport path passing through the position facing the line head 26 intersects both the horizontal direction and the vertical direction, and is configured to transport the medium in an obliquely upward direction. This obliquely upward transport direction is a direction including the −X direction component and the +Z direction component in FIG. 1, and the horizontal direction dimension of the printer 1 can be suppressed by such a configuration. In the present embodiment, a medium transport path passing through the position facing the line head 26 is set at an inclination angle in a range of 50° to 70° with respect to a horizontal direction, more specifically, set at an inclination angle of 60°.

The medium on which recording has been executed on the first surface by the line head 26 is further sent in an obliquely upward direction by a transport roller pair 17 positioned downstream of the transport belt 33. A flap 23 is provided downstream of the transport roller pair 17, and the transport direction of the medium is switched by the flap 23. When the medium is discharged as it is, the transport path of the medium is switched by the flap 23 toward a transport roller pair 20 above. A flap 24 is further provided on the downstream side of the transport roller pair 20, and the transport path is switched by the flap 24 to either discharge from a discharge position A1 or transport to a transport roller pair 21 located vertically above. When the medium is sent toward the transport roller pair 21, the medium is discharged from a discharge position A2. The medium discharged from the discharge position A1 is received by a discharge tray 27 that is inclined in an obliquely upward direction including a +X direction component and a +Z direction component. The medium discharged from the discharge position A2 is received by an optional tray (not shown).

When recording is further executed on the second surface in addition to the first surface of the medium, the medium is sent by the flap 23 in an obliquely upward direction including a −X direction component and +Z direction component, passes through a branch position K1, and is sent from the branch position K1 to an upper switchback path. A transport roller pair 22 is provided in the switchback path, and the medium entered the switchback path is transported upward by the transport roller pair 22, and when the upstream end of the medium has passed through the branch position K1, the direction of rotation of the transport roller pair 22 is switched, and the medium is transported downward.

The medium transported downward by the transport roller pair 22 receives feed force from a transport roller pair 18, a transport roller pair 19, and the transport roller pair 15, reaches the transport roller pair 16, and is again transported to the transport belt 33 by the transport roller pair 16. The medium sent again to the position facing the line head 26, the second surface opposite to the first surface on which recording has already been executed faces the line head 26. This enables recording by the line head 26 on the second surface of the medium. The medium on which recording has been performed on the second surface is discharged from the discharge position A1 or the discharge position A2 described above.

Figure 3:
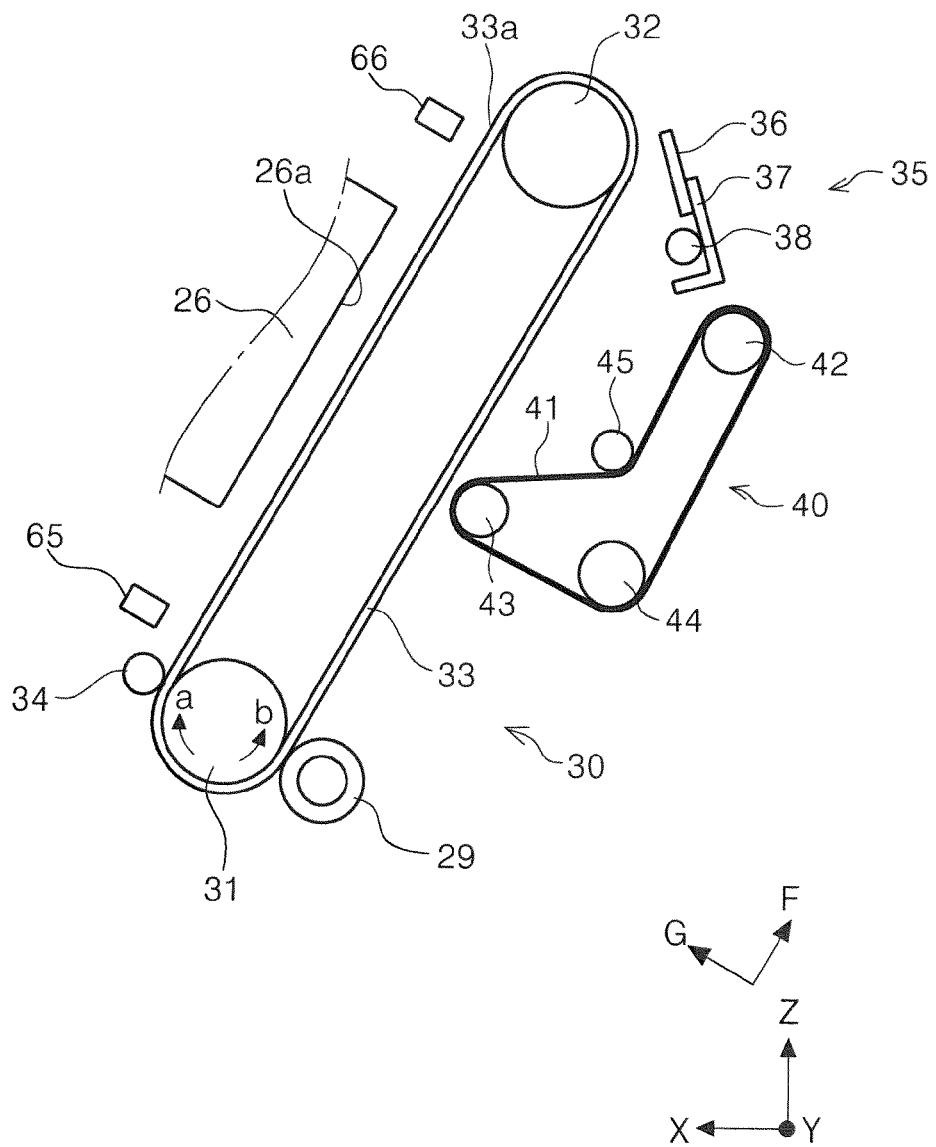
FIG. 3 is a side view of a transport belt, a first cleaning section, and a second cleaning section.
Figure 4:
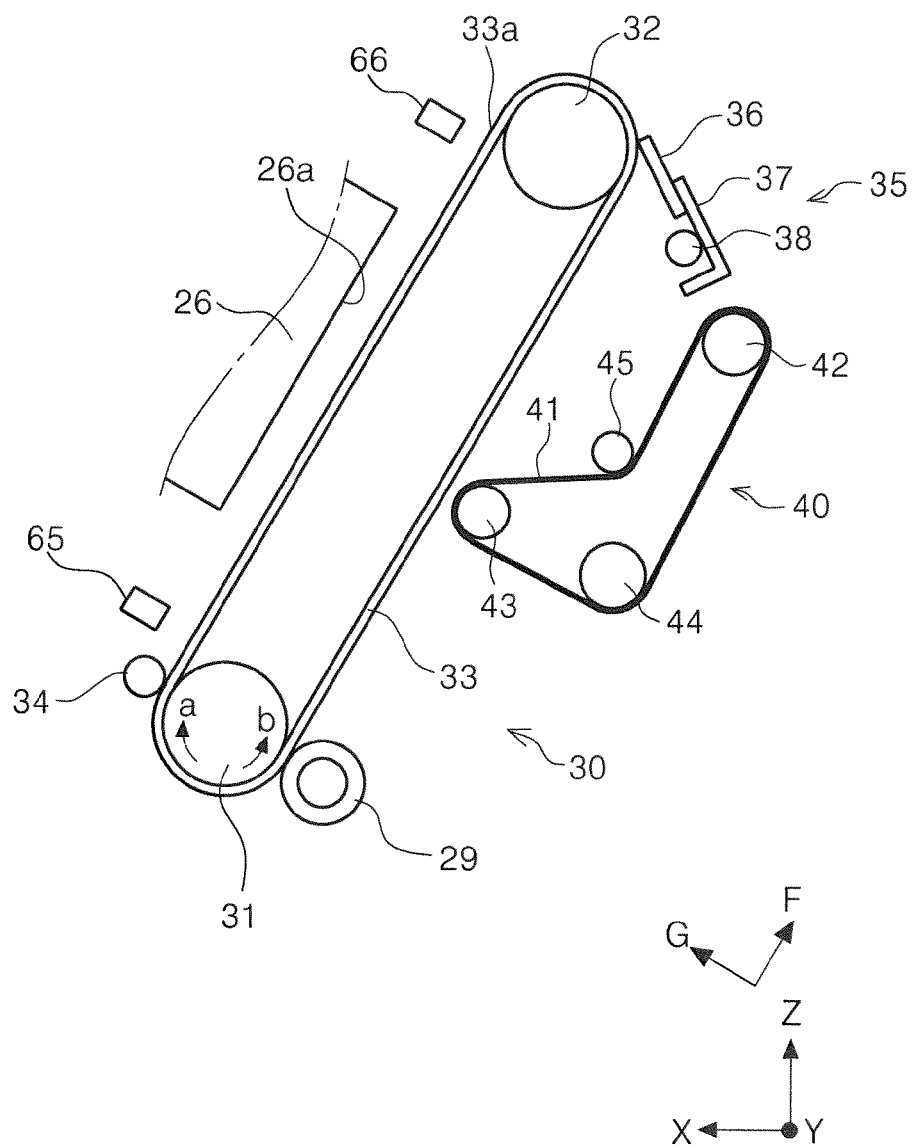
FIG. 4 is a side view of the transport belt, the first cleaning section, and the second cleaning section.

Next, the belt unit 30, a first cleaning section 35, and a second cleaning section 40 will be described with reference to FIG. 3 and FIG. 4. The transport belt 33 constituting the belt unit 30 is an endless belt including a base material made of urethane, rubber, or the like and a conductive material contained in the base material as needed in order to adjust a resistance value, and is wound around a drive pulley 31 on an upstream side and a driven pulley 32 on a downstream side. A predetermined tension is applied to the transport belt 33 by a tensioner (not shown).

Figure 2:
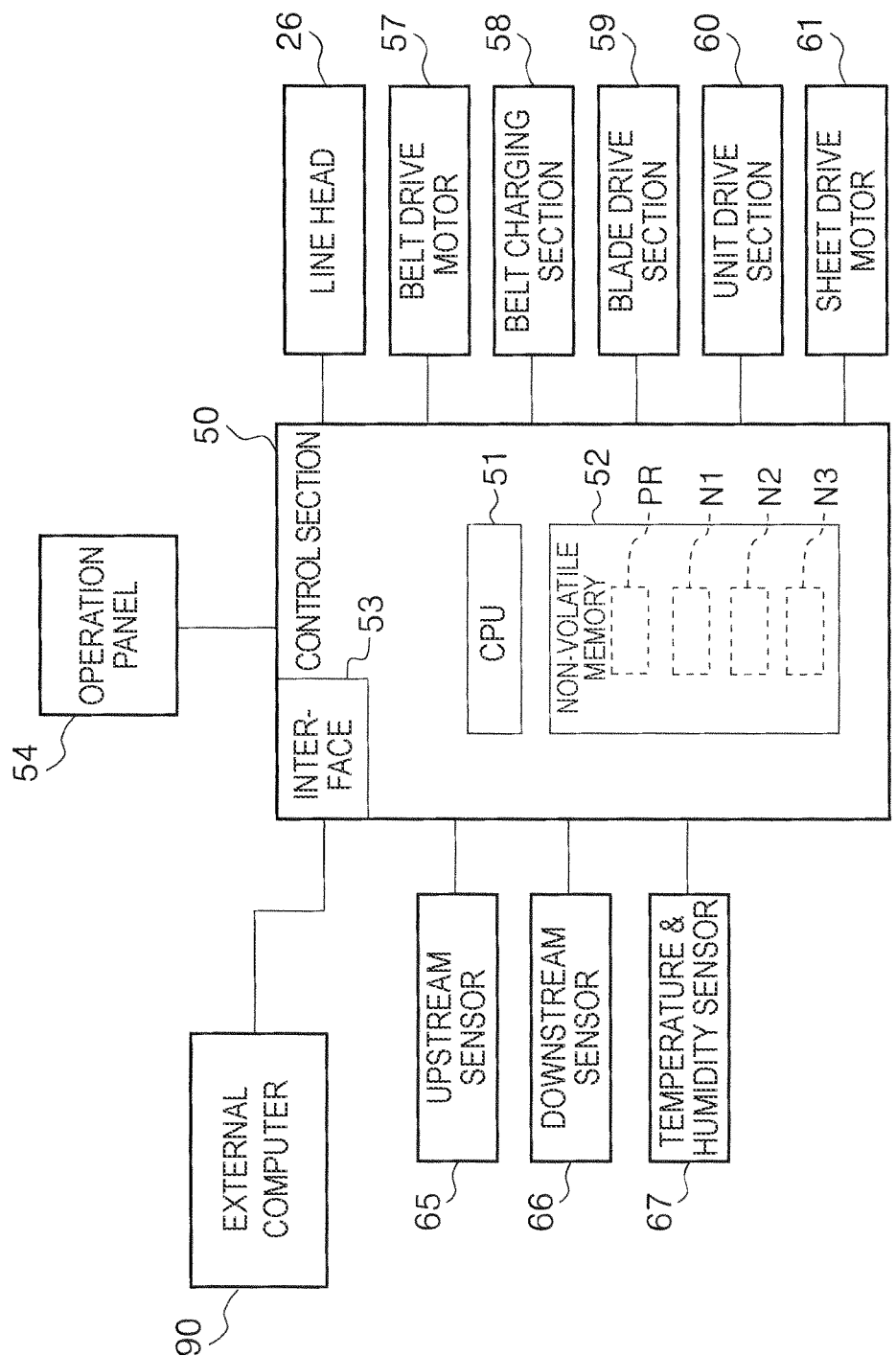
FIG. 2 is a block diagram showing a configuration and a control system of a belt unit.

The drive pulley 31 is rotationally driven by a belt drive motor 57 (see FIG. 2) that is controlled by a control section 50 (see FIG. 2). When the drive pulley 31 is rotationally driven in the direction of the arrow a, the transport belt 33 rotates in the clockwise direction in FIG. 3 and FIG. 4. Hereinafter, this rotation of the transport belt 33 may be referred to as "forward rotation". When the drive pulley 31 is rotationally driven in the direction of the arrow b, the transport belt 33 rotates in the counterclockwise direction in FIG. 3 and FIG. 4. Hereinafter, this rotation of the transport belt 33 may be referred to as "reverse rotation".

A charging roller 29 is provided at a position facing the drive pulley 31 with the transport belt 33 in between. The charging roller 29 is in contact with the outer surface of the transport belt 33 and rotates following the rotation of the transport belt 33. A DC voltage is applied to the charging roller 29 by a belt charging section 58 (see FIG. 2), whereby the charging roller 29 supplies electric charges to a portion in contact with the transport belt 33. The belt charging section 58 (see FIG. 2) is controlled by the control section 50 to switch the voltage applied to the charging roller 29 on and off, and to switch the voltage applied to the charging roller 29.

In this embodiment, the charging roller 29 supplies positive charges to the transport belt 33 and charges the outer peripheral surface 33a of the transport belt 33 with a positive polarity, so that the outer peripheral surface 33a of the transport belt 33 becomes an attraction surface for attracting the medium.

A support roller 34 that contacts the medium is provided upstream of the line head 26. The support roller 34 presses the medium against a portion of the transport belt 33 wound around the drive pulley 31. The support roller 34 is grounded, whereby the charge on the recording surface side of the medium is removed.

Next, the first cleaning section 35 is provided in the vicinity of the driven pulley 32. The first cleaning section 35 includes a blade 36 as an example of a cleaning member that cleans the outer peripheral surface 33a of the transport belt 33. The blade 36 is fixed to a fixing member 37, and the fixing member 37 is rotatably provided around a rotation axis 38.

As an example, the blade 36 is a plate shaped elastic member having a predetermined thickness, is formed of urethane, rubber, or the like, and can be elastically deformed in a state of being in contact with the transport belt 33. A tip portion of the blade 36 is brought into contact with a portion of the transport belt 33 wound around the driven pulley 32 to clean the outer peripheral surface 33a of the transport belt 33.

The rotation axis 38 is rotated by a blade drive section 59 (see FIG. 2), and the rotation of the rotation axis 38 causes the blade 36 to switch between a contact state (see FIG. 4) in which the blade 36 is in contact with the transport belt 33 and a separation state (see FIG. 3) in which the blade 36 is separated from the transport belt 33. By the forward rotation of the transport belt 33 in the contact state of the blade 36, deposits such as ink and paper dust adhering to the outer peripheral surface 33a of the transport belt 33 are removed. The blade drive section 59 (see FIG. 2) may be composed of an actuator such as a motor. In addition, the control section 50 can adjust the pressing force when the blade 36 is pressed against the transport belt 33 by adjusting the rotation amount of the rotation axis 38.

The second cleaning section 40 is provided below the first cleaning section 35. The second cleaning section 40 includes a cleaning sheet 41. The cleaning sheet 41 is wound around a drive pulley 42 and driven pulleys 43 and 44, and tension is applied to the cleaning sheet 41 by a tensioner 45.

The cleaning sheet 41 is an endless fabric in the present embodiment, and can be pressed against the 33a of the outer peripheral surface of the transport belt 33 by the driven pulley 43. The drive pulley 42 is rotationally driven by a sheet drive motor 61 (see FIG. 2). The drive pulley 42 is rotationally driven in the clockwise direction in FIG. 3, whereby the cleaning sheet 41 is circularly moved in the clockwise direction in FIG. 3.

The second cleaning section 40 is provided so as to be movable in a direction in which the second cleaning portion 40 advances and retreats with respect to the transport belt 33, specifically, along the G axis direction, and advances and retreats with respect to the transport belt 33 by receiving a power of a unit drive section 60 (see FIG. 2). The unit drive section 60 can be composed of an actuator such as a motor. When the second cleaning section 40 advances with respect to the transport belt 33, the cleaning sheet 41 is pressed against the transport belt 33 by the driven pulley 43, and in this state, the transport belt 33 rotates in the forward rotation and the cleaning sheet 41 moves in a circulating manner, so that the outer peripheral surface 33a of the transport belt 33 is wiped. Note that FIG. 3 and FIG. 4 show a state in which the second cleaning section 40 has retreated with respect to the transport belt 33, and a state in which the second cleaning section 40 has advanced with respect to the transport belt 33 is not shown.

The belt drive motor 57, the belt charging section 58, the blade drive section 59, the unit drive section 60, and the sheet drive motor 61 are controlled by a control section 50 as a control means as shown in FIG. 2. The control section 50 is a control unit that controls the entire printer 1, and controls the line head 26, a medium transport motor (not shown), and the like in addition to the above described configuration.

The control section 50 includes a CPU 51 and a nonvolatile memory 52, and the nonvolatile memory 52 stores a program PR for performing various controls of the printer 1, various parameters, and the like. The program PR includes programs for realizing various controls to be described later, and various parameters necessary for executing the program PR are stored in the nonvolatile memory 52. Reference numeral N1 denotes data relating to cleaning control information to be described later, reference numeral N2 denotes data relating to ejection amount adjustment information to be described later, and reference numeral N3 denotes data relating to ejection region setting information.

A signal from an operation panel 54 is input to the control section 50, and a signal for displaying information is output from the control section 50 to a display section (not shown) of the operation panel 54. Various setting information inputted through the operation panel 54 is stored in the nonvolatile memory 52. The control section 50 performs various controls based on the various setting information.

The control section 50 includes an interface 53 for communicating with an external computer 90. The control section 50 acquires recording data which is data for executing recording and which is generated by a printer driver operating in the external computer 90 or by a printer driver included in the control section 50. Then, based on the recording data, each mechanical part including the line head 26 is controlled. The recording data also includes size information of the medium.

Detection signals of various sensors are input to the control section 50, and the control section 50 performs necessary control based on the detection signals. FIG. 2 shows an upstream sensor 65, a downstream sensor 66, and a temperature and humidity sensor 67, which are some of the various sensors. As shown in FIG. 3 and FIG. 4, the upstream sensor 65 is provided at a position facing the transport belt 33 and upstream of the line head 26. Further, the downstream sensor 66 is provided at a position facing the transport belt 33 and downstream of the line head 26. Each of the upstream sensor 65 and the downstream sensor 66 is an optical sensor including a light emitting section that emits light toward the transport belt 33 and a light receiving section that receives reflected light from the transport belt 33 or a medium. Based on the detection signal of the upstream sensor 65, the control section 50 can detect the passage of the medium leading end or the medium trailing end at the position of the upstream sensor 65, and can detect the passage of the medium leading end or the medium trailing end at the position of the downstream sensor 66.

In particular, the control section 50 determines that a medium jam has occurred, when passage of the leading end of the medium is not detected at the position of the downstream sensor 66 even when a predetermined time elapses after the passage of the leading end of the medium is detected at the position of the upstream sensor 65. When the control section 50 determines that a medium jam has occurred, the control section 50 stops the recording operation. The stopping of the recording operation includes stopping of ink ejection from the line head 26 and stopping of driving of the transport belt 33 and other transport roller pairs.

The temperature and humidity sensor 67 is provided inside the apparatus, and the control section 50 can determine the temperature and humidity inside the apparatus based on information received from the temperature and humidity sensor 67. In the present embodiment, it is more desirable that the temperature and humidity sensor 67 be disposed near the transport belt 33. This is because, as will be described in detail later, the temperature or the humidity acquired by the temperature and humidity sensor 67 in the present embodiment is used to determine the ease or difficulty of drying the ink adhering to the transport belt 33.

In the present embodiment, the control section 50 cleans the outer peripheral surface 33a of the transport belt 33 using at least one of the first cleaning section 35 and the second cleaning section 40. The control section 50 can select a first cleaning mode, which uses only the first cleaning section 35, a second cleaning mode, which uses both the first cleaning section 35 and the second cleaning section 40, and a third cleaning mode, which uses only the second cleaning section 40.

For example, during a periodic cleaning operation, the control section 50 selects the first cleaning mode. The control section 50, having a means for counting the elapsed time since the periodic cleaning operation is executed, executes the periodic cleaning operation when the elapsed time from the previous execution of the periodic cleaning operation reaches a prescribed time. Further, when the printer 1 transitions to a standby state after a recording job ends, the first cleaning mode is also executed.

For example, the control section 50 selects the second cleaning mode when the user removes the medium and presses the OK button of the operation panel 54 after the recording operation is stopped due to a medium jam. When a medium jam occurs in this manner, there is a concern that ink will be erroneously ejected to the transport belt 33 and that the ink will adhere to the transport belt 33. Therefore, the control section 50 executes the cleaning operation in the second cleaning mode. Note that a preliminary ejection described below is applied to the second cleaning mode, but is not limited thereto.

For example, when the number of execution times of double-sided recording reaches a predetermined value, or when there is a possibility that water condensation has occurred on the transport belt 33, the control section 50 selects the third cleaning mode. The control section 50 has a means for counting the number of execution times of double-sided recording, and, when the number of execution times of double-sided recording reaches a predetermined value, executes the cleaning operation in the third cleaning mode. This is because, when double-sided recording is executed, a first surface recorded first comes into contact with the transport belt 33 when recording the opposite second surface, and thus ink may adhere to the transport belt 33. In addition, if water condensation occurs on the transport belt 33, the medium may get wet, so the control section 50 executes the cleaning operation in the third cleaning mode. Examples of when water condensation may occur on the transport belt 33 include when humidity suddenly changes to a high humidity state, and when the temperature rises sharply from a state where the transport belt 33 was left at a low temperature.

Figure 5:
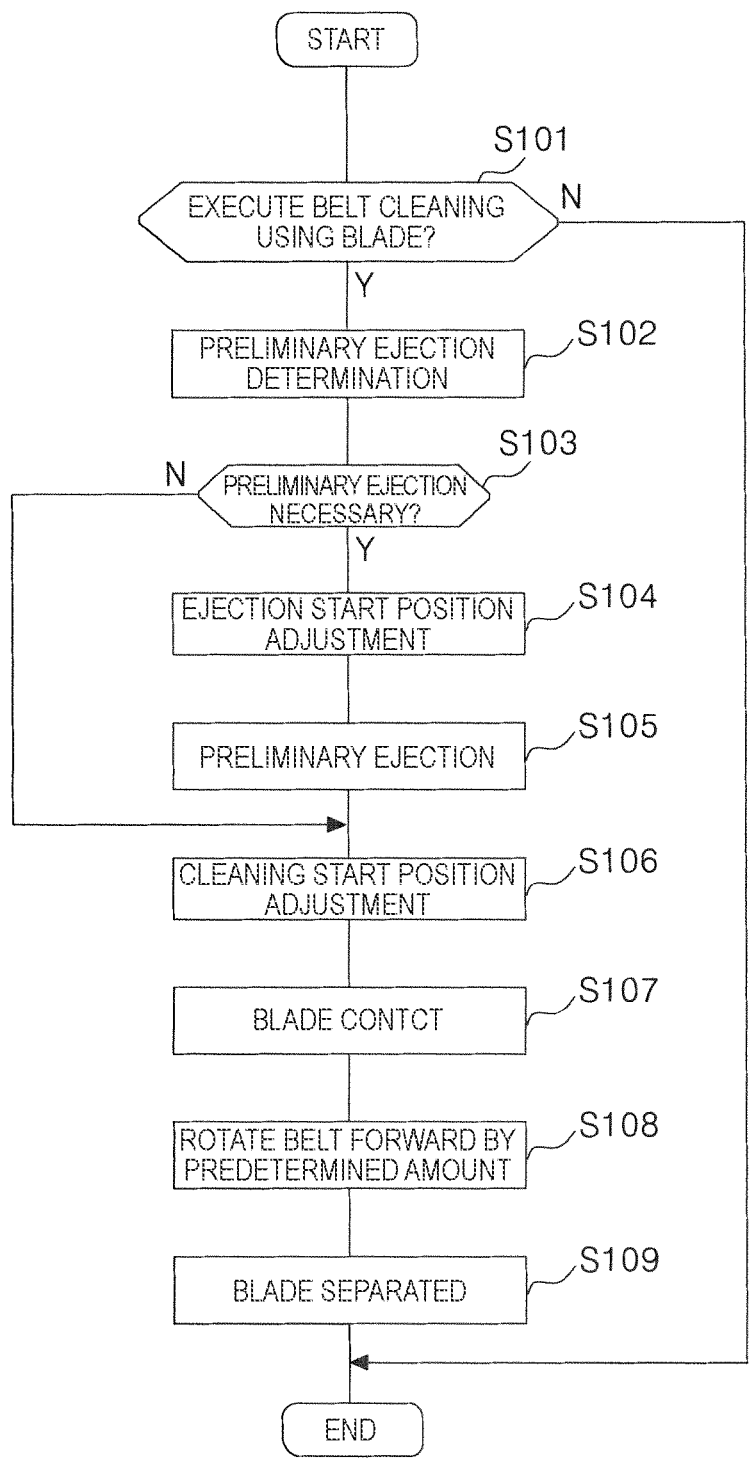
FIG. 5 is a flowchart showing flow of belt cleaning using a blade.

Next, the preliminary ejection when cleaning the transport belt 33 by using the first cleaning section 35 will be described. The preliminary ejection at the time of cleaning the transport belt 33 is, which will be described in detail later, is to intentionally eject ink toward the transport belt 33 in order to improve slipperiness between the transport belt 33 and the blade 36 before the transport belt 33 is cleaned by the blade 36. FIG. 5 shows the control flow when the transport belt 33 is cleaned using the first cleaning section 35. If the control section 50 executes the belt cleaning operation using the first cleaning unit 35, that is, the blade 36 (Yes in step S101), then preliminary ejection determination is performed (step S102).

The preliminary ejection determination in step S102 includes determination of whether or not to execute the preliminary ejection, and, when the preliminary ejection is executed, a determination of the ink ejection position and the ink ejection amount with respect to the transport belt 33, and the cleaning start position of the blade 36. These details will be described later.

If the control section 50 determines that preliminary ejection is necessary (Yes in step S103), the control section 50 executes ejection start position adjustment (step S104).

This ejection start position adjustment is an operation of rotating the transport belt 33 so that the position of the transport belt 33 where the preliminary ejection is to start faces the line head 26. In the present embodiment, at the timing when it is determined that a medium jam has occurred and drive of the transport belt 33 is stopped, the position at which the preliminary ejection is to start has passed the contact position of the blade 36 in the forward rotation direction. Therefore, the ejection start position adjustment is mainly performed by reverse rotation of the transport belt 33. Then, the control section 50 executes the preliminary ejection (step S105).

Next, the control section 50 adjusts the cleaning start position of the blade 36 (step S106). When preliminary ejection (step S105) is being executed, this cleaning start position adjustment is mainly performed by forward rotation of the transport belt 33. When the preliminary ejection (step S105) is not being executed, the cleaning start position adjustment in step S106 is mainly performed by reverse rotation of the transport belt 33. This is because, as described above, at the timing when it is determined that a medium jam has occurred and drive of the transport belt 33 has been stopped, the position at which the preliminary ejection is to start has passed in the forward rotation direction from the contact position of the blade 36. By the cleaning start position adjustment in step S106, the blade 36 comes to the cleaning start position.

Next, the control section 50 switches the blade 36 from the separation state to the contact state (step S107), and in this state, rotates the transport belt 33 in the forward rotation direction by a predetermined amount to clean the transport belt 33 with the blade 36 (step S108). When the cleaning of the transport belt 33 with the blade 36 ends, the blade 36 is switched from the contact state to the separation state (step S109).

Figure 6:
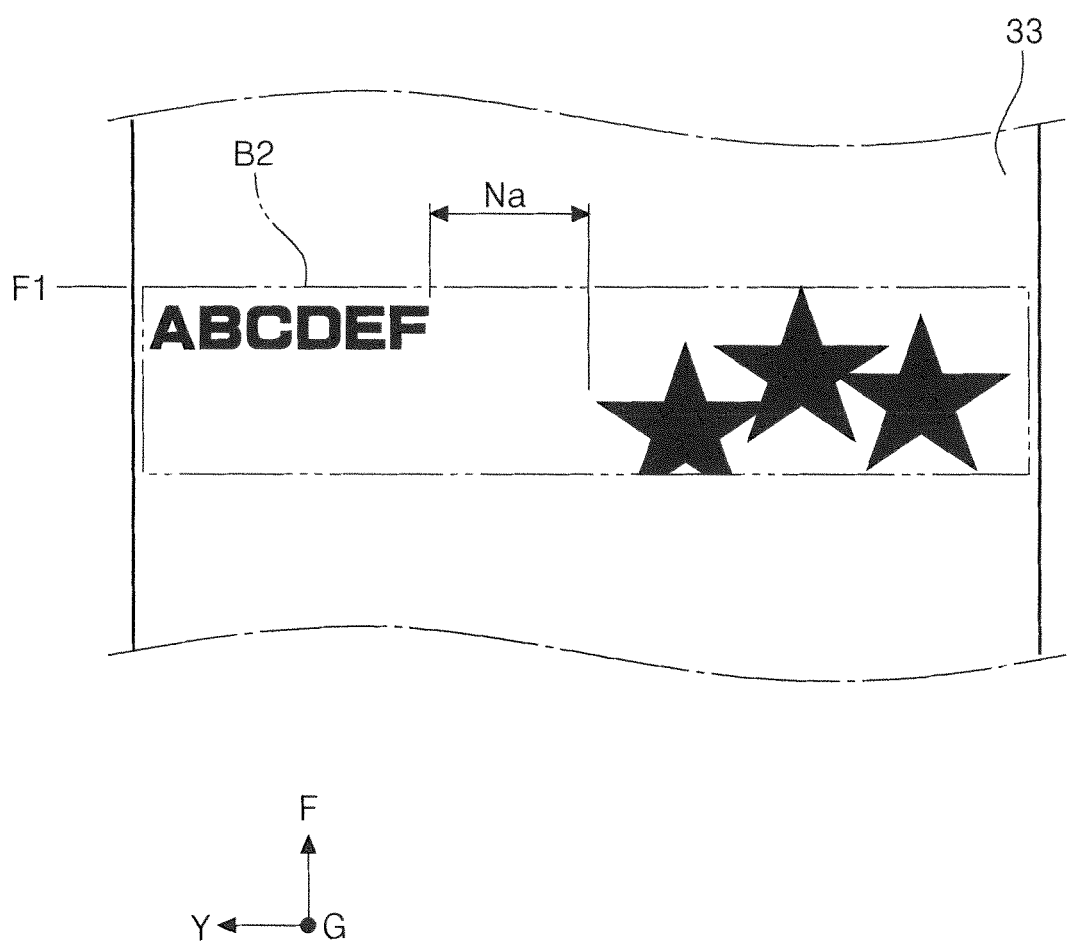
FIG. 6 is a diagram showing an example of an ink ejection region in a case where ink is erroneously ejected onto a transport belt.

Next, the preliminary ejection determination process of step S102 will be described in detail. FIG. 6 shows an example of a case where ink is erroneously ejected onto the transport belt 33 due to occurrence of a medium jam, and a region B2 indicates an ink erroneous ejection region. The region B2 is a part of the entire recording region of the medium. The region B2 shown in the example of FIG. 6 includes an ink landing portion and an ink non-landing portion. In particular, the region in the medium width direction indicated by a reference sign Na is a region in which there is no ink landing portion along the traveling direction of the transport belt 33. In FIG. 6, the traveling direction of the transport belt 33 is the upward direction (+F direction) in the drawing.

Since the landing portion is a wet region, the slipperiness between the transport belt 33 and the blade 36 is good. On the other hand, when there are ink non-landed portions or ink landed portions with only a small amount of ink, the slipperiness between the transport belt 33 and the blade 36 is poor. In particular, the region Na is a region in which there are no ink landing portions along the traveling direction of the transport belt 33, so the slipperiness between the transport belt 33 and the blade 36 is the poorest. If the slipperiness between the transport belt 33 and the blade 36 is poor, the edge portion of the blade 36 in contact with the transport belt 33 may be damaged, such as turning-up, chipping, and wearing down, and the function of the blade 36 may not be maintained. Therefore, the control section 50 executes a preliminary ejection in which ink is ejected in advance from the line head 26 to the transport belt 33 based on preset cleaning control information.

In this manner, when the control section 50 executes the cleaning operation for cleaning the transport belt 33 by the blade 36, the control section 50 executes the preliminary ejection for ejecting ink in advance from the line head 26 to the transport belt 33 based on the preset cleaning control information. Therefore, the slipperiness between the transport belt 33 and the blade 36 is improved by this preliminary ejection, and thereby the function of the blade 36 can be maintained.

Hereinafter, an example of the cleaning control information will be described. It is assumed that the cleaning control information described below is stored in advance in a nonvolatile memory 52 (see FIG. 2) included in the control section 50. Tables shown in FIGS. 7A, 7B, 7C and 7 D are examples of the cleaning control information. The temperature and the humidity hereinafter mean the temperature and the humidity obtained by the temperature and humidity sensor 67 (see FIG. 2). Further, the temperature and the humidity hereinafter are the temperature and the humidity when executing the cleaning operation of cleaning the transport belt 33 with the blade 36 as an example. Further, hereinafter, the ejection duty means the ejection duty when ink is erroneously ejected from the line head 26. Here, the ejection duty is the ratio of the recorded region within a predetermined region of the medium. The lower the ejection duty, the smaller the amount of ink that is ejected, and the higher the ejection duty, the larger the amount of ink that is ejected.

As the ejection duty, the ejection duty in the region where the ink is actually ejected onto the transport belt 33 (for example, the region B2 in FIG. 6) can be adopted. Hereinafter, this is referred to as an "actual ejection duty". As an example, the control section 50 can obtain the actual ejection duty based on the ink ejection amount ejected from when the medium front end was detected by the upstream sensor 65 to when drive of the transport belt 33 is stopped, and on the recording region corresponding thereto (for example, the region B2 in FIG. 6). Since the actual ejection duty is based on the ink ejection amount actually ejected onto the transport belt 33, it can be said that the actual ejection duty reflects the state of the transport belt 33 more accurately. Also, although the region B2 in FIG. 6 is a part of the entire recording region, the ejection duty for the entire recording region may be employed. Hereinafter, this is referred to as "total ejection duty". The control section 50 can obtain the total ejection duty based on the recording data. The total ejection duty can be calculated more easily than the actual ejection duty because it is not necessary to calculate the ink ejection amount actually ejected to the transport belt 33. The control section 50 adopts either the actual ejection duty or the total ejection duty based on the designation of the program PR (see FIG. 2) or the cleaning control information. Thus, in the present disclosure, the ejection duty when ink is erroneously ejected does not mean only the ejection duty in the region where the ink is actually ejected onto the transport belt 33.

FIGS. 7A, 7B, 7C and 7D show examples in which the humidity and the ejection duty are set in the cleaning control information as preliminary ejection execution conditions. In FIGS. 7A to 7D, ejection duty is "SUITABLE" in the case of a first event, wherein the ejection duty is lower than a first ejection duty, and "UNSUITABLE" otherwise. Hereinafter, "SUITABLE" means suitable for preliminary ejection, and "UNSUITABLE" means not suitable for preliminary ejection. "SUITABLE" ejection duty means occurrence of a first event. In the present embodiment, the first ejection duty may also be referred as a threshold value of the ejection duty.

When a first event occurs in which the ejection duty is lower than the first ejection duty, the slipperiness between the transport belt 33 and the blade 36 is poorer than when a first event does not occur. Thus, the occurrence of a first event favors the execution of the preliminary ejection.

Humidity is "SUITABLE" in the case of a second event, wherein humidity is lower than a first humidity, and "UNSUITABLE" otherwise. "SUITABLE" humidity means occurrence of a second event. In this embodiment, the first humidity may also be referred as a threshold value of the humidity. When a second event occurs in which the humidity is lower than the first humidity, the ink dries more easily than when a second event does not occur, and the slipperiness between the transport belt 33 and the blade 36 is poor. Thus, the occurrence of a second event favors execution of the preliminary ejection.

In FIGS. 7A to 7D, "ON" means that the preliminary ejection is executed, and "OFF" means that the preliminary ejection is not executed. In the examples of FIGS. 7A, 7B, 7C and 7D, when the above-described first event and the above-described second event occur at the same time, then "ON" is set, that is, a preliminary ejection is executed by the control section 50, and when the above-described first event and the above-described second event do not occur at the same time, then "OFF" is set, that is, a preliminary ejection is not executed by the control section. Even if a first event occurs, if the second event does not occur, the slipperiness between the transport belt 33 and the blade 36 is likely to be secured. Conversely, even if the second event occurs, if the first event does not occur, the slipperiness between the transport belt 33 and the blade 36 is likely to be secured. According to the examples of FIGS. 7A, 7B, 7C, and 7D, since the preliminary ejection is not executed in such cases, wasteful consumption of ink can be suppressed.

In the example of FIG. 7A, the ejection duty is divided into the range of "LOW" and "HIGH", and the first ejection duty as the threshold defines the boundary between "LOW" and "HIGH", but as shown in FIG. 7B and FIG. 7D, the ejection duty may be divided into the range of "LOW", "MEDIUM", and "HIGH", and the first ejection duty as the threshold may define the boundary between "MEDIUM" and "HIGH". Similarly, in the example of FIG. 7A, the humidity is divided into "LOW" and "HIGH" ranges, and the first humidity as the threshold value defines the boundary between "LOW" and "HIGH", but as shown in FIG. 7C and FIG. 7D, the humidity may be divided into "LOW", "MEDIUM", and "HIGH" ranges, and the first humidity as the threshold value may define the boundary between "LOW" and "MEDIUM".

In FIG. 7B, the humidity "MEDIUM" is set to "UNSUITABLE", but the humidity "MEDIUM" may be set to "SUITABLE" as shown in FIG. 8A. In the examples of FIGS. 7A, 7B, 7C and 7D, when the above-described first event and the above-described second event occur at the same time, then "ON" is set, that is, the control section 50 executes a preliminary ejection, and when the above-described first event and the above-described second event do not occur at the same time, then "OFF" is set, that is, the control section does not execute a preliminary ejection, but a portion of settings may be changed. For example, in the example of FIG. 7D, the humidity "MEDIUM" and "LOW" are set as "SUITABLE" for the occurrence of the second event. In the above example, it becomes "ON" when the humidity is "MEDIUM" and the ejection duty is "MEDIUM". However, it may be set "OFF" when the ejection duty is "MEDIUM" even if the humidity is "MEDIUM", because the slipperiness between the transport belt 33 and the blade 36 is secured. FIG. 8B shows such an example.

In addition to the humidity and the ejection duty, at least one of the temperature and the elapsed time from the ink was erroneously ejected may be included in the cleaning control information as a preliminary ejection execution condition. That is, one or more of ejection duty, humidity, and the temperature at the time when ink is erroneously ejected from the line head 26, and the elapsed time after ink was erroneously ejected, may be included in the cleaning control information as a preliminary ejection execution condition. In this case, it is desirable that at least one of the first event, in which the ejection duty is lower than the first ejection duty, the second event, in which the humidity is lower than the first humidity, a third event, in which the temperature is higher than a first temperature, and a fourth event, in which the elapsed time is longer than a first elapsed time, is set to affect the execution of the preliminary ejection. As a result, the preliminary ejection is appropriately executed according to the state at the time of executing the cleaning operation, and the function of the blade 36 can be maintained. Further, when the preliminary ejection is not necessary, the preliminary ejection is not executed, thus wasteful consumption of ink can be suppressed. Note that as described above, "events that affect the execution of the preliminary ejection" does not mean that the preliminary ejection is always executed when each of the events occurs, but means that the occurrence of the events favors the execution of the preliminary ejection. In addition, the control section 50 does not need to store in the non-volatile memory 52 the information related to other events except for the events necessary for determining the preliminary ejection among the above events.

The start timing of the elapsed time after the ink is erroneously ejected can be set to a first ink ejection timing for the entire recording surface, a last ink ejection timing for the entire recording surface, or an intermediate timing between the first ink ejection timing and the last ejection timing for the entire recording surface. Alternatively, the start timing of the elapsed time can be set to a first ink ejection timing for a region (for example, region B2 in FIG. 6) where ink is actually ejected onto the transport belt 33, a last ink ejection timing for the region where ink is actually ejected onto the transport belt 33, or an intermediate timing between the first ink ejection timing and the last ink ejection timing for a region where ink is actually ejected onto the transport belt 33. Further, the end timing of the elapsed time can be set to a timing when a user removes a medium and presses an OK button on the operation panel 54 after the recording operation is stopped due to the medium jam. Hereinafter, when simply referred to as "elapsed time", it means the time elapsed from when ink was erroneously ejected, as determined by the control section 50 in the above manner.

Hereinafter, a case in which the temperature and the elapsed time are adopted will be described. Temperature is "SUITABLE" in the case of a third event, wherein the temperature is higher than a first temperature, and "UNSUITABLE" otherwise. "SUITABLE" temperature means occurrence of a third event. In the present embodiment, the first temperature may be also referred as a threshold value of the temperature. When a third event occurs in which the temperature is higher than the first temperature, the ink dries more easily than when a third event does not occur, and the slipperiness between the transport belt 33 and the blade 36 is poor. Thus, the occurrence of the third event favors the execution of the preliminary ejection. In addition, elapsed time is "SUITABLE" in the case of a forth event relates, wherein the elapsed time is longer than a first elapsed time, and "UNSUITABLE" otherwise. "SUITABLE" elapsed time means occurrence of a fourth event. In the present embodiment, the first elapsed time may be also referred as a threshold value of the elapsed time. When a fourth event occurs in which the elapsed time is longer than the first elapsed time, the ink dries more easily than when a fourth event does not occur, and slipperiness between the transport belt 33 and the blade 36 is poor. Thus, occurrence of a forth event favors execution of a preliminary ejection. Temperature and elapsed time can be adopted by replacing these third and fourth events with one or both of the first and second events in the examples of FIGS. 7A, 7B, 7C, and 7D. Of course, only a third event or a fourth event may be adopted as a preliminary ejection execution condition.

When one or both of temperature and elapsed time are applied in the examples of FIGS. 7A, 7B, 7C and 7D, then when it "ON" is in the examples of FIGS. 7A, 7B, 7C and 7D, then when temperature or elapsed time is "SUITABLE", in the end it also becomes "ON" and preliminary ejection is executed. If the temperature is "UNSUITABLE" or the elapsed time is "UNSUITABLE", the preliminary ejection is not executed even when "ON" is set in the examples of FIGS. 7A, 7B, 7C and 7D.

As described above, in the examples of FIGS. 7A, 7B, 7C and 7D, humidity and ejection duty are set as preliminary ejection execution conditions, but only one of humidity, ejection duty, temperature, and elapsed time may be set as preliminary ejection execution conditions. Specifically, when only ejection duty is set as a preliminary ejection execution condition, preliminary ejection is executed when a first event, in which the ejection duty is lower than the first ejection duty, occurs. Alternatively, when only humidity is set as a preliminary ejection execution condition, a preliminary ejection is executed when a second event, in which the humidity is lower than the first humidity, occurs. Alternatively, when only temperature is set as a preliminary ejection execution condition, a preliminary ejection is executed when a third event, in which the temperature is higher than the first temperature, occurs. Alternatively, when only elapsed time is set as a preliminary ejection execution condition, a preliminary ejection is executed when a fourth event, in which the elapsed time is longer than the first elapsed time, occurs.

Next, the control section 50 may be configured to be able to adjust the ink ejection amount when executing a preliminary ejection based on ejection amount adjustment information set in advance. If the ink ejection amount at the time of executing a preliminary ejection is set to an appropriate amount, then the slipperiness between the transport belt 33 and the blade 36 becomes good, and wasteful consumption of ink can also be suppressed.

It is desirable that the ejection amount adjustment information include one or more of ejection duty, humidity, temperature, and elapsed time as adjustment conditions of the ink ejection amount, and also that at least one of a decrease in the ejection duty, a decrease in the humidity, an increase in the temperature, and an increase in the elapsed time be set to influence an increase in the ink ejection amount in the preliminary ejection. This increases the ink ejection amount when slipperiness between the transport belt 33 and the blade 36 is poor, and can appropriately improve slipperiness between the transport belt 33 and the blade 36. Note that the control section 50 need not store in the nonvolatile memory 52 information regarding conditions other than information regarding conditions necessary for adjusting the ink ejection amount among the ejection duty, the humidity, the temperature, and the elapsed time.

A specific example of ejection amount adjustment information will be described below with reference to FIGS. 9A, 9B, 9C, and 9D. The coefficients shown in FIGS. 9A to 9D are coefficients to be multiplied by a standard ink ejection amount Sh when executing a preliminary ejection. Therefore, the smaller the coefficient to be multiplied, the smaller the amount of ink ejected during the preliminary ejection, and conversely, the larger the coefficient, the larger the amount of ink ejected during the preliminary ejection. FIG. 9A shows coefficients set for an ejection duty Q. The ejection duty Q increases in the order of Q1, Q2, and Q3, and the larger the ejection duty Q, the smaller the coefficient. This is because the larger the ejection duty Q, the better the slipperiness between the transport belt 33 and the blade 36. Said differently, the smaller the ejection duty Q, the smaller the coefficient.

FIG. 9B shows the coefficients set for a humidity H. The humidity H increases in the order of the H1, H2, H3, and H4, and the higher the humidity H, the smaller the coefficient. This is because the higher the humidity H, the harder it is for the ink to dry, and the slipperiness between the transport belt 33 and the blade 36 is maintained. Said differently, the lower the humidity H, the larger the coefficient.

FIG. 9C shows the coefficients set for a temperature S. The temperature S increases in the order of S1, S2, S3, and S4, and the higher the temperature S, the larger the coefficient. This is because the higher the temperature S, the more drying of the ink progresses, and the slipperiness between the transport belt 33 and the blade 36 becomes poorer. Said differently, the lower the temperature S, the smaller the coefficient.

FIG. 9D shows the coefficients set for an elapsed time T. The elapsed time T becomes longer in the order of T1, T2, and T3, and the longer the elapsed time T, the larger the coefficient. This is because the longer the elapsed time T, the more drying of the ink progresses, and the slipperiness between the transport belt 33 and the blade 36 becomes poorer. Said differently, the shorter the elapsed time T, the smaller the coefficient.

As described above, a decrease in the ejection duty Q, a decrease in the humidity H, an increase in the temperature S, and an increase in the elapsed time T affect to increase the ink ejection amount in the preliminary ejection. Any of the coefficient of the ejection duty Q, the coefficient of the elapsed time T, and the coefficient of the humidity H, for example, may be used as the coefficient that is multiplied by the standard ink ejection amount Sh. Alternatively, both the coefficient of the elapsed time T and the coefficient of the ejection duty Q may be multiplied by the standard ink ejection amount Sh. Alternatively, both the coefficient of the ejection duty Q and the coefficient of the humidity H may be multiplied by the standard ink ejection amount Sh. Alternatively, all of the coefficient of the elapsed time T, the coefficient of the ejection duty Q, and the coefficient of the humidity H may be multiplied by the standard ink ejection amount Sh. Alternatively, all of the coefficient of the ejection duty Q, the coefficient of the humidity H, the coefficient of the temperature S, and the coefficient of the elapsed time T may be multiplied by the standard ink ejection amount Sh. That is, the ejection amount adjustment information may include one or more of the ejection duty Q, the humidity H, the temperature S, and the elapsed time T as adjustment conditions of the ink ejection amount when the preliminary ejection is executed.

In addition, the ejection amount adjustment information includes the ejection duty Q as a determination condition of the ink ejection amount at the time of a preliminary ejection, and the control section 50 may calculate the ejection duty Q for each region defined along the width direction (Y axis direction), which is a direction intersecting the traveling direction (+F direction) of the transport belt 33, and may adjust the ink ejection amount for the each region. FIG. 10 shows such an example, and reference numerals Y1, Y2, Y3, Y4, Y5 and Y6 indicate a plurality of regions defined along the width direction (Y axis direction). The regions constitute a region B2.

Since the region Y3 is a region where the ink was not ejected and the slipperiness between the transport belt 33 and the blade 36 is poor, ink of the standard ink ejection amount Sh is ejected to such a region (preliminary ejection region Db2). On the other hand, for example, a smaller amount of ink than the standard ink ejection amount Sh is ejected to the regions Y1 and Y2 (preliminary ejection region Db1), and an even smaller amount of ink is ejected (preliminary ejection region Db3) to the regions Y4, Y5 and Y6, where the largest amount of ink was ejected. The adjustment of the ink ejection amount in each region is performed, for example, by multiplying the coefficients shown in FIG. 9A by the standard ink ejection amount Sh. In this manner, the control section 50 calculates the ejection duty Q for each of the regions defined along the width direction and adjusts the ink ejection amount for each of the regions. As a result, the ink ejection amount during the preliminary ejection is adjusted in a finer range, the slipperiness between the transport belt 33 and the blade 36 becomes better, and wasteful consumption of ink can be suppressed.

In the above example, the ejection duty Q is calculated for each region defined along the width direction and the ink ejection amount is adjusted for each region, but in this case, one or more of the coefficient of humidity H, the coefficient of temperature S, and the coefficient of elapsed time T described with reference to FIGS. 9B, 9C and 9D may be further applied.

Next, the ink ejection position when executing the preliminary ejection will be described. In the example shown in FIG. 10, the control section 50 executes the preliminary ejection so that the preliminary ejection regions Db1, Db2, and Db3 come into contact with the blade 36 prior to the region B2 where ink has landed on the transport belt 33 due to erroneous ejection. In FIG. 10, the preliminary ejection regions Db1, Db2 and Db3 are set in the +F direction with respect to the region B2. By setting the preliminary ejection position in this way, the blade 36 is in a wet state before cleaning the erroneous ejection region B2, in which the ink is erroneously ejected, so that the function of the blade 36 can be more reliably maintained.

Note that in the example of FIG. 10, the preliminary ejection regions Db1, Db2 and Db3 do not overlap with the region B2, but a part of the preliminary ejection regions Db1, Db2, and Db3 may overlap with the region B2. When the preliminary ejection regions Db1, Db2, and Db3 do not need to contact the blade 36 before the region B2, all of the preliminary ejection regions Db1, Db2, and Db3 may overlap with the region B2.

In addition, the control section 50 may execute a preliminary ejection so as to avoid a portion of the transport belt 33 where the ink landed due to erroneous ejection. Here, executing a preliminary ejection so as to avoid a portion where the ink has landed due to erroneous ejection means, for example, ejecting the ink to a portion where ink has not landed inside region B2 in FIG. 6. In this way, by executing the preliminary ejection while avoiding already wet portions, wasteful consumption of the ink can be suppressed. Also in this case, the ejection amount adjustment described with reference to FIGS. 9A, 9B, 9C, and 9D may be performed.

Further, when executing the preliminary ejection, the control section 50 may be configured to be able to select, based on ejection region setting information set in advance, a first ejection mode in which ink is ejected so as to avoid a portion where ink has landed due to erroneous ejection on the transport belt 33, and a second ejection mode in which ink is ejected toward a portion where ink has landed, and a portion where ink has not landed, on the transport belt 33 due to erroneous ejection. The ejection region setting information is the information stored in a nonvolatile memory 52 (see FIG. 2) included in the control section 50. In the example of FIG. 6, when the first ejection mode is selected, the ink is ejected to a portion where the ink has not landed inside the area B2. In addition, in a case where the second ejection mode is selected, the ink is ejected to both the portion where the ink has landed and the portion where the ink has not landed inside the region B2. As a result, the amount of ink consumed can be suppressed in the first ejection mode. Further, in the second ejection mode, ink is also ejected to a portion where ink landed on the transport belt 33 due to an erroneous ejection, so that the ink that landed due to the erroneous ejection can be softened, and the cleaning effect can be enhanced.

The ejection region setting information may be set such that the control section 50 selects the first ejection mode when the humidity exceeds a reference humidity, and selects the second ejection mode when the humidity is equal to or lower than the reference humidity. Accordingly, when drying of the portion on the transport belt 33 where ink landed due to erroneous ejection has not progressed, the first ejection mode is selected, so that ink consumption can be suppressed. Further, when drying of the portion where ink landed on the transport belt 33 due to erroneous ejection has progressed, the second ejection mode is selected, so that the ink that has landed on the transport belt 33 due to the erroneous ejection can be softened, and the cleaning effect can be enhanced.

In each of the embodiments described above, the control section 50 may rotate the transport belt 33 while maintaining the blade 36 in the separation state until the blade 36 faces the region where ink landed on the transport belt 33, and may switch the blade 36 from the separation state to the contact state when the blade 36 faces the region where ink landed on the transport belt 33. As a result, in the example of FIG. 6, cleaning by the blade 36 is performed from a position F1 which is an end portion of the region B2 in the +F direction, or from a position slightly in the +F direction from F1 toward the −F direction. By such control, it is possible to suppress the period during which the blade 36 is in contact with the region of the transport belt 33 where ink has not landed, so that the function of the blade 36 can be more reliably maintained.

The preliminary ejection described above is applied to cleaning of the transport belt 33 after ink is erroneously ejected, but is not limited thereto, and may be applied to the periodic cleaning operation described above or other cleaning operations. In addition, in the present embodiment, the line head 26 is provided with nozzle rows for each ink color of cyan, magenta, yellow, and black, but a nozzle row used when executing the preliminary ejection may be the nozzle row of any ink color, or the preliminary ejection may be executed using all the nozzle rows. If the slipperiness between the transport belt 33 and the blade 36 varies depending on the ink color, the preliminary ejection may be executed using ink of an ink color that has the best slipperiness among a plurality of ink colors. Further, although the temperature and humidity sensor 67 is configured to be provided inside the apparatus, it is not limited to this configuration and may be provided outside the apparatus. The temperature sensor and the humidity sensor may be provided separately, and in this case, at least one of the temperature sensor and the humidity sensor may be provided outside the apparatus.

Furthermore, the present disclosure is not limited to the embodiments described above, and various modifications are possible within the scope of the disclosure described in the claims, and it goes without saying that these modifications are also included within the scope of the present disclosure.

What is claimed is:

1. A liquid ejection apparatus comprising:
    a liquid ejection section that ejects liquid onto a medium;
    a transport belt that faces the liquid ejection section and transports the medium;
    a cleaning member for cleaning the transport belt by coming into contact with the transport belt, the cleaning member being capable of switching between a contact state in which the cleaning member comes into contact with the transport belt and a separation state in which the cleaning member is separated from the transport belt; and
    a control section that controls an ejection operation of the liquid by the liquid ejection section, a rotation operation of the transport belt, and switching of a state of the cleaning member, wherein:
    when the control section performs a cleaning operation of cleaning the transport belt by the cleaning member, the control section executes, based on preset cleaning control information, a preliminary ejection that ejects liquid from the liquid ejection section to the transport belt in advance, and
    as a preliminary ejection execution condition, the preset cleaning control information includes one or more of ejection duty at the time of erroneous ejection, humidity, temperature, and an elapsed time after the erroneous ejection.

2. The liquid ejection apparatus according to claim 1, wherein
    at least one of a first event in which ejection duty is lower than a first ejection duty, a second event in which humidity is lower than a first humidity, a third event in which temperature is higher than a first temperature, and a fourth event in which elapsed time is longer than a first elapsed time, affects execution of preliminary ejection.

3. The liquid ejection apparatus according to claim 2, wherein:
    the cleaning control information includes ejection duty and humidity as preliminary ejection execution conditions, and the control section executes a preliminary ejection when a first event and a second event occur simultaneously and does not execute a preliminary ejection when a first event and a second event do not occur simultaneously.

4. The liquid ejection apparatus according to claim 2, wherein:
    the control section adjusts, based on ejection amount adjustment information set in advance, a liquid ejection amount when executing a preliminary ejection.

5. The liquid ejection apparatus according to claim 4, wherein:
    the ejection amount adjustment information includes one or more of ejection duty, humidity, temperature, and elapsed time as adjustment conditions of the liquid ejection amount, and at least one of decrease in ejection duty, decrease in humidity, increase in temperature, and increase in elapsed time affects an increase in the liquid ejection amount of the preliminary ejection.

6. The liquid ejection apparatus according to claim 5, wherein:
    the ejection amount adjustment information includes ejection duty as a determination condition of the liquid ejection amount and
    the control section calculates an ejection duty for each region defined along a width direction, which is a direction intersecting a traveling direction of the transport belt, and adjusts the liquid ejection amount for each region.

7. The liquid ejection apparatus according to claim 2, wherein:
    the control section executes a preliminary ejection so that a preliminary ejection region contacts the cleaning member before a region where liquid landed due to an erroneous ejection on the transport belt.

8. The liquid ejection apparatus according to claim 2, wherein:
    the control section executes a preliminary ejection so as to avoid a portion of the transport belt on which liquid landed due to an erroneous ejection.

9. The liquid ejection apparatus according to claim 2, wherein:
    when a preliminary ejection is executed, the control section selects, based on ejection region setting information set in advance, a first ejection mode in which liquid is ejected so as to avoid a portion where liquid landed due to an erroneous ejection on the transport belt or a second ejection mode in which liquid is ejected toward a portion where liquid landed due to an erroneous ejection and a portion where liquid did not land due to an erroneous ejection on the transport belt.

10. The liquid ejection apparatus according to claim 9, wherein:
    the ejection region setting information is set to cause the control section to select the first ejection mode when humidity exceeds a reference humidity and to cause the control section to select the second ejection mode when humidity is equal to or lower than the reference humidity.

11. The liquid ejection apparatus according to claim 1, wherein:
    the control section rotates the transport belt while maintaining the cleaning member in the separation state until the cleaning member faces a region where liquid landed on the transport belt, and switches the cleaning member from the separation state to the contact state when the cleaning member faces the region where liquid landed on the transport belt.

12. The liquid ejection apparatus according to claim 1, wherein the preliminary ejection intentionally ejects liquid from the liquid ejection section to the transport belt in advance of the cleaning operation in order to improve a slipperiness between the transport belt and the cleaning member during the cleaning operation.

13. A control method of a liquid ejection apparatus, the liquid ejection apparatus including a liquid ejection section that ejects liquid onto a medium;
- a transport belt that faces the liquid ejection section and transports the medium; and
- a cleaning member that cleans the transport belt by coming into contact with the transport belt, the cleaning member is capable of switching between a contact state in which the cleaning member comes into contact with the transport belt and a separation state in which the cleaning member is separated from the transport belt, the method of controlling the liquid device comprising:
when the transport belt is cleaned by the cleaning member, a preliminary ejection is performed in which liquid is ejected from the liquid ejection section to the transport belt in advance,
wherein as a preliminary ejection execution condition, preset cleaning control information includes one or more of ejection duty at the time of erroneous ejection, humidity, temperature, and an elapsed time after the erroneous ejection.

14. A non-transitory computer-readable recording medium having stored therein a program that is executed by a control section of a liquid ejection apparatus,
the liquid ejection apparatus including a liquid ejection section that ejects liquid onto a medium;
- a transport belt that faces the liquid ejection section and transports the medium; and
- a cleaning member that cleans a transport belt by coming into contact with the transport belt, the cleaning member being capable of switching between a contact state in which the cleaning member is in contact with the transport belt and a separation state in which the cleaning member is separated from the transport belt, the program having a step of, when the transport belt is cleaned by the cleaning member, executing a preliminary ejection in which liquid is ejected in advance from the liquid ejection section to the transport belt, wherein as a preliminary ejection execution condition, preset cleaning control information includes one or more of ejection duty at the time of erroneous ejection, humidity, temperature, and an elapsed time after the erroneous ejection.

* * * * *